United States Patent Office 3,116,283
Patented Dec. 31, 1963

3,116,283
PREPARATION OF NITROGEN HETEROCYCLIC COMPOUNDS
Arthur Boller and Andor Furst, Basel, and Werner Meier, Binningen, Switzerland, assignors to Hoffmann-La Roche Inc., Nutley, N.J., a corporation of New Jersey
No Drawing. Filed June 23, 1959, Ser. No. 822,213
Claims priority, application Switzerland July 4, 1958
3 Claims. (Cl. 260—239)

This invention relates to novel chemical processes. More particularly, it relates to novel methods for the preparation of compounds broadly characterized as belonging to the class of 6,7-dihydro-5H-dibenz[c,e]azepine and its 6-substitution products. The 6-substituted 6,7-dihydro-5H-dibenz[c,e]azepines are known substances useful as sympatholytic agents. More particularly, the compound 6-allyl-6,7-dihydro-5H-dibenz[c,e]azepine has found clinical application in medicine as adrenergic blocking agent, under the non-proprietary designation azapetine (also known under the registered trademark Ilidar).

In a comprehensive embodiment, the invention provides a process which comprises reacting 2,2'-diphenyl dialdehyde with an amine having the general formula (I)   $RNH_2$ wherein R represents a member containing not more than eight carbon atoms selected from the group consisting of hydrogen, lower alkyl radicals, lower alkenyl radicals, ω-hydroxy-lower alkyl radicals, ω-di(lower alkyl) amino (lower alkyl) radicals, monocyclic cycloalkyl radicals, monocyclic aryl hydrocarbon radicals and monocyclic aralkyl hydrocarbon radicals, and reducing the reaction product, thereby forming a compound having the general formula (II)
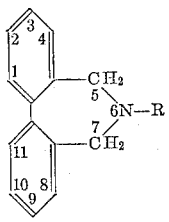

wherein R has the same meaning indicated above.

Illustrative, but not limitative, embodiments of the symbol R include such members as hydrogen; methyl, ethyl, n-butyl; allyl; β-hydroxyethyl; β-diethylaminoethyl; cyclopentyl, cyclohexyl; phenyl; benzyl; and the like.

In an initial stage of the comprehensive process referred to above 2,2'-diphenyl-dialdehyde is reacted with the amine of Formula I. Advantageously, somewhat more than one equivalent of the amine is employed. It is convenient to effect this stage of the reaction in such manner that the heat of reaction evolved is absorbed by the use of cooling media, so that the reaction temperature does not greatly exceed room temperature. The presence of a solvent is not strictly necessary, although it is often convenient to use one, as will be indicated below.

In another phase of the comprehensive process referred to above, the product of the reaction between 2,2'-diphenyl-dialdehyde and the amine of Formula I is subjected to reduction. This reduction can be effected by either catalytic reduction processes using elemental hydrogen or by non-catalytic reduction processes using non-elementary reducing agents. For catalytic reduction, it is desirable that the reaction product referred to above be dissolved in a lower alkanol, which may, if desired, contain water. Suitable catalysts are particularly platinum hydrogenation catalysts and palladium hydrogenation catalysts. Catalytic reduction can be effected either at normal or at elevated pressures. Reduction by non-catalytic processes can be effected, for example, by treating the reaction product of 2,2'-diphenyl-dialdehyde and the amine of Formula I with concentrated formic acid (e.g., practically anhydrous) or with dilute aqueous formic acid at elevated temperatures, preferably in a range from about 40 to 140° C. Advantageously, reduction in this manner is effected by the use of two or more equivalents of formic acid, calculated on the dialdehyde, and in the same medium as used for the reaction of the dialdehyde with the amine of Formula I. Reduction with formic acid is attended by vigorous evolution of carbon dioxide. The end of the reaction can be recognized by cessation of the generation of gas.

In a particularly convenient mode of execution of the invention, the reducing agent, e.g., concentrated or aqueous formic acid, is introduced before the step of reacting the dialdehyde with the amine of Formula I. In this case formic acid may also serve as a solvent.

In another variant of the process, the amine of Formula I above has one of its hydrogen atoms substituted by the formyl radical. Thus, for example, it is often convenient to employ formamide rather than ammonia, or N-formyl allyl amine rather than allyl amine itself. In the event that the product of the reduction stage still contains a formyl radical attached to the nitrogen atom in the 6-position, the formyl radical can readily be removed by methods known per se, for example by treatment with a hydrolysis reagent, such as mineral acids, e.g., aqueous or alcoholic hydrochloric acid.

When the product obtained is 6,7-dihydro-5H-dibenz[c,e]azepine, the hydrogen in the 6-position can be replaced by any desired substituent of the type defined above in connection with the symbol R, by methods known per se. Moreover, the 6-substituted bases thus obtained can be converted to acid addition salts or to quaternary salts, by methods which are also known per se.

The invention is further disclosed in the following examples, which are illustrative but not limitative thereof. Temperatures are in degrees centigrade.

*Example 1*

To a solution of 21 g. of 2,2'-diphenyl-dialdehyde in 100 cc. of methanol is added, while stirring, within a period of two minutes, 20 cc. of 25% aqueous ammonia solution, whereupon heat is generated. Upon cooling of the reaction mixture colorless needles separate. The reaction mixture is cooled in an ice bath, the precipitate is filtered off and is washed with cold alcohol and ether. The material is dried in vacuo, yielding 18 g. of 5-hydroxy-5H-dibenz[c,e]azepine of M.P. 139–140°. Upon addition of 40 cc. of water to the mother liquor, an additional qauantity of 2.5 g. of this product separates. There is thus obtained a total of 20.5 g. of 5-hydroxy-5H-dibenz[c,e]azepine. Upon recrystallization from alcohol, this compound melts at 141–142°.

A solution of 6.4 g. of 5-hydroxy-5H-dibenz[c,e]azepine in 18.4 g. of 99% formic acid is heated at 100–120° until evolution of carbon dioxide ceases; time of reaction, about 90 minutes. The reaction mixture is then concentrated at 70° under a water pump vacuum, the residue is refluxed for 45 minutes with 30 cc. of 10% ethanolic hydrogen chloride, and the reaction mixture is cooled. Colorless needles separate from the solution; M.P. of needles, 285–288°. By concentration of the mother liquor, further material can be recovered, so that a total of 5.8 g. of 6,7-dihydro-5H-dibenz[c,e]azepine hydrochloride is obtained. The compound, after recrystallization from alcohol, melts at 288–291°.

A suspension of 21 g. of 5-hydroxy-5H-dibenz[c,e]-azepine and 2 g. of palladium black in 400 cc. of methanol is shaken at room temperature in a hydrogen atmosphere. As the uptake of hydrogen progresses, solution takes place. After cessation of hydrogen uptake, the catalyst is filtered off and the filtrate is evaporated on a water bath. Distillation of the residue yields 17.6 g. of 6,7-dihydro-5H-dibenz[c,e]azepine in the form of a practically colorless viscous oil of B.P. 113–115°/0.03 mm. Upon addition of alcoholic hydrogen chloride to an alcoholic solution of this base, 6,7-dihydro-5H-dibenz[c,e]-azepine hydrochloride separates, which melts at 288–291°. The neutral oxalate, which is prepared by addition of half an equivalent of oxalic acid to an alcoholic solution of the base, has a decomposition point at 252–254°.

*Example 2*

30 g. of 2,2′-diphenyl-dialdehyde is refluxed for 3½ hours with 6.45 g. of formamide and 20 g. of 99% formic acid. There is obtained a crystalline residue of crude 6-formyl-6,7-dihydro-5H-dibenz[c,e]azepine, which upon recrystallization from ethanol shows a melting point of 179–180°.

The crude formyl compound is refluxed for 24 hours with 210 cc. of 5 N hydrochloric acid. The volatile components are then removed in vacuo at 50°, the residue is treated with 300 cc. of water and mixed with excess 30% caustic soda solution, causing the separation of an oil. The reaction mixture is extracted three times with ether, dried over potassium carbonate and the solvent is removed. There is obtained 15.5 g. of 6,7-dihydro-5H-dibenz[c,e]azepine as a viscous brownish oil, which boils in a high vacuum at 113–115°/0.03 mm.

*Example 3*

To 1 g. of reduced platinum oxide in 100 cc. of alcohol is added 52.5 g. of 2,2′-diphenyl-dialdehyde. This is mixed with 500 cc. of alcohol containing 4.26 g. of ammonia, whereupon complete solution of the dialdehyde occurs with gentle evolution of heat. The reaction mixture is now shaken in a hydrogen atmosphere at room temperature until completion of the hydrogenation, which takes approximately 26 hours. The catalyst is filtered off, the filtrate is evaporated and the residue is distilled in a high vacuum. There is thus obtained 45 g. of 6,7-dihydro-5H-dibenz[c,e]azepine as a colorless viscous oil of B.P. 112–114°/0.03 mm.

*Example 4*

10.5 g. of 2,2′-diphenyl-dialdehyde and 4 g. of n-butylamine are mixed, while cooling, with 16 g. of 70% formic acid. The reaction mixture is then maintained at a temperature of 80–140° until completion of the evolution of carbon dioxide. After approximately 80 minutes the gas evolution ceases, whereupon the solution is cooled, mixed with 100 cc. of water, extracted with 50 cc. of ether and the aqueous phase is brought to pH 10 by addition of concentrated caustic soda solution. The oil which separates is extracted by shaking the reaction mixture twice with 80 cc. portions of ether. The combined ethereal solutions are dried over anhydrous potassium carbonate, filtered and freed of solvent, whereupon 6 - n - butyl - 6,7 - dihydro - 5H - dibenz[c,e]azepine is obtained as a light greenish viscous oil. This oil is taken up in 40 cc. of alcohol and the solution obtained is mixed with 5 cc. of 60% hydrobromic acid. 15 g. of the hydrobromide of 6-n-butyl-6,7-dihydro-5H-dibenz[c,e]azepine separates; decomposition point, 168–179°. Upon recrystallization from alcohol, the salt melts at 172–173° with decomposition.

*Example 5*

A solution of 10.5 g. of 2,2′-diphenyl-dialdehyde and 3.65 g. of n-butylamine in 100 cc. of alcohol is shaken at room temperature in a hydrogen atmosphere in the presence of 300 mg. of platinum oxide until the completion of hydrogenation. The catalyst is filtered off and the filtrate is concentrated on a water bath. The residual oil is taken up in 40 cc. of alcohol and 5 cc. of 60% hydrobromic acid is added, yielding 10.5 g. of the hydrobromide of 6-n-butyl-6,7-dihydro-5H-dibenz[c,e]azepine as colorless crystals. By concentration of the mother liquors an additional quantity of 4.4 g. of product can be isolated. After recrystallization twice from alcohol, the compound obtained melts at 172–173° with decomposition.

*Example 6*

A suspension prepared, while cooling, from 21 g. of 2,2′-diphenyl-dialdehyde, 6.2 g. of allyl amine and 30 g. of 75% formic acid is heated at 60–120° until the evolution of carbon dioxide ceases. The reaction mixture is cooled, mixed with 200 cc. of water and extracted with 50 cc. of benzene. Then, while cooling, the acidic aqueous phase is made alkaline to phenolphthalein by addition of concentrated caustic soda solution and the oily base which separates is extracted with two 100 cc. portions of benzene. The combined benzene extracts are dried over potassium carbonate, filtered and evaporated. The crude residue is distilled in a high vacuum, whereupon 18.2 g. of 6-allyl-6,7-dihydro-5H-dibenz[c,e]-azepine is obtained as an almost colorless oil of B.P. 114–116°/0.03 mm. The hydrochloride is formed by addition of ethanolic hydrogen chloride to an ethanolic solution of the base. It crystallizes in the form of colorless needles of M.P. 213–214°.

By addition of 85% phosphoric acid solution to an ethanolic solution of the base, there is obtained the phosphate of M.P. 210–212°.

*Example 7*

10.5 g. of 2,2′-diphenyl-dialdehyde is melted with 4.7 g. of formic acid allyl amide (which is prepared from ethyl formate and allyl amine; B.P. 101–103°/13 mm.). 11.5 g. of 99% formic acid is added to the reaction mixture and the mixture is refluxed until the evolution of carbon dioxide ceases, which point is reached in about 24 hours. Then the reaction mixture is freed of volatile components at 50° in vacuo, the residue is mixed with 100 cc. of water, and purified by being shaken three times with ether. The aqueous solution is then mixed with 30% caustic soda solution in excess, whereupon an oil separates. The latter is extracted by shaking three times with ether, the extract is dried over potassium carbonate and the solvent is evaporated. There is obtained 9 g. of 6-allyl-6,7-dihydro-5H-dibenz[c,e]azepine, which is treated with phosphoric acid as described in Example 6, whereupon 12 g. of the phosphate of M.P. 210–212° is obtained.

*Example 8*

7.5 g. of 2,2′-diphenyl-dialdehyde, 4.8 g. of aniline and 15 g. of 70% formic acid are heated at 80–150° until the evolution of carbon dioxide ceases. After cooling the reaction mixture, the gummy residue is taken up in 80 cc. of benzene and this solution is washed twice with 60 cc. portions of 2 N caustic soda solution and then with water. The benzene solution is dried over anhydrous potassium carbonate, filtered and the filtrate is evaporated on a water bath. The oily residue is now heated with 50 cc. of high boiling petroleum ether and the solution obtained is poured off from undissolved material. The petroleum ether solution is concentrated and upon cooling there separates therefrom 6 g. of colorless crystals of M.P. 82–84°. Further quantities can be obtained by repeated concentration of the mother liquor. Upon recrystallization from high boiling petroleum ether, the 6 - phenyl - 6,7 - dihydro-5H-dibenz[c,e]azepine obtained melts at 85.5–86.5°. Upon addition of the base to alcoholic hydrogen bromide, there is precipitated the corresponding hydrobromide which has a melting point of 230–232°.

*Example 9*

A solution of 10.5 g. of 2,2′-diphenyl-dialdehyde and 4.7 g. of aniline in 200 cc. of alcohol is shaken at room temperature in a hydrogen atmosphere in the presence of 400 mg. of platinum oxide until the hydrogen uptake ceases. In a period of 26 hours, approximately 2.4 liters of hydrogen is taken up. Then the catalyst is filtered off and the filtrate is evaporated. The oily residue is taken up in 50 cc. of hot high boiling petroleum ether. Upon cooling, 2,2'-di(hydroxymethyl)diphenyl of M.P. 112–113° crystallizes out as a byproduct. This is filtered off, the solvent is evaporated and the residue is taken up in 10 cc. of benzene. The benzene solution is filtered through a column of 200 g. of neutral aluminum oxide of activity grade III. The column is then eluted with petroleum ether and petroleum ether/benzene mixture (1:1). The combined eluates are concentrated and cooled, resulting in the formation of crystals. The precipitate is filtered off and crystallized from high boiling petroleum ether, whereupon 6-phenyl-6,7-dihydro-5H-dibenz[c,e]azepine of M.P. 85.5–86.5° is obtained. The base, upon treatment with alcoholic hydrogen bromide, yields a hydrobromide of M.P. 230–232°.

*Example 10*

5.25 g. of 2,2'-diphenyl-dialdehyde, 2.9 g. of benzylamine and 10 g. of 99% formic acid are heated at 80–130° until the evolution of carbon dioxide ceases, which requires about 60 minutes. The reaction mixture is cooled and made alkaline with concentrated caustic soda solution. The oily material which separates is taken up in ether, the ether solution is washed with a little water and dried over anhydrous potassium carbonate. After filtration and evaporation of the filtrate on a water bath, there remains a light greenish oil, which is dissolved in 20 cc. of alcohol and is precipitated as hydrochloride by addition of 10 cc. of 25% alcoholic hydrogen chloride. There is thus obtained 5.9 g. of colorless crystals of M.P. 198–200°. By concentration of the mother liquor an additional quantity of 0.8 g. of the salt can be obtained. Upon recrystallization from alcohol the hydrochloride of 6-benzyl-6,7-dihydro-5H-dibenz[c,e]azepine melts at 201–202°.

*Example 11*

A solution of 5.25 g. of 2,2'-diphenyl-dialdehyde and 2.7 g. of benzylamine in 50 cc. of alcohol is shaken at room temperature in a hydrogen atmosphere in the presence of 200 mg. of platinum oxide until the gas uptake ceases. In a period of 2½ hours, approximately 1.2 liters of hydrogen is taken up. Then the catalyst is filtered off and the filtrate is evaporated. The residual oil is taken up in 20 cc. of alcohol and precipitated as hydrochloride by addition of 10 cc. of 25% ethanolic hydrogen chloride. There are obtained 6.2 g. of colorless needles of M.P. 198–200°. By concentration of the mother liquor an additional quantity of 1.2 g. of substance of the same melting point is obtained. The hydrochloride of 6 - benzyl - 6,7 - dihydro-5H-dibenz[c,e]azepine melts, after recrystallization from alcohol, at 201–202°.

*Example 12*

5.25 g. of 2,2'-diphenyl-dialdehyde, 1.73 g. of β-aminoethanol and 10 g. of 99% formic acid are heated at 100–130° until carbon dioxide evolution ends. After about 60 minutes the evolution of gas has ceased and the reaction mixture is then cooled and mixed with 80 cc. of water. Small quantities of neutral materials are removed by extraction with ether. The aqueous solution is then made alkaline by addition of concentrated caustic soda solution and the oily base thus separated is taken up in ether. The ethereal solution is dried over anhydrous potassium carbonate, filtered, and the filtrate is concentrated on a water bath. The thus obtained greenish viscous oil is taken up in 20 cc. of alcohol, mixed with a solution of 3 g. of phosphoric acid in 10 cc. of alcohol and then maintained for 15 minutes at 70° whereupon crystallization has already begun. After cooling, the crystalline material is filtered off. There is thus obtained 7.6 g. of 6-β-hydroxyethyl-6,7-dihydro-5H-dibenz[c,e]azepine phosphate as a colorless crystalline powder of M.P. 183–184°. Upon recrystallization from aqueous alcohol this phosphate melts at 185–186°.

*Example 13*

A solution of 5.25 g. of 2,2'-diphenyl-dialdehyde and 1.53 g. of β-aminoethanol in 50 cc. of alcohol is shaken in a hydrogen atmosphere at room temperature and in the presence of 200 mg. of platinum oxide until the uptake of hydrogen has ceased. In a period of three hours, about 1.18 liters of hydrogen is taken up. The catalyst is filtered off and the filtrate is concentrated. The residual oil is taken up in 20 cc. of alcohol and a solution of 3 g. of 85% phosphoric acid in 10 cc. of alcohol is added, yielding 7.7 g. of colorless crystals of M.P. 182–183°. After recrystallization from aqueous alcohol there is obtained 6-(β-hydroxyethyl)-6,7-dihydro-5H - dibenz[c,e]azepine phosphate of M.P. 185–186°.

*Example 14*

5.25 g. of 2,2'-diphenyl-dialdehyde, 3.2 g. of 2-diethylaminoethylamine and 15 g. of 99% formic acid are heated at 80–130° until the evolution of carbon dioxide ceases (requires about one hour). Then the reaction mixture is cooled and mixed with 100 cc. of water. Neutral materials present are removed by extraction with ether. The aqueous acidic solution is then made alkaline by addition of concentrated caustic soda solution and the oily base which separates is taken up in ether. The ethereal solution is dried over anhydrous potassium carbonate, filtered and concentrated. There is thus obtained 6-(β-diethylaminoethyl)-6,7-dihydro-5H-dibenz[c,e]azepine as a light greenish oil. This is taken up in 20 cc. of alcohol and mixed with a solution of 6 g. of 85% phosphoric acid in 15 cc. of alcohol, whereupon the diphosphate of the base precipitates. After recrystallization from water/acetone, this diphosphate melts at 238–239°.

*Example 15*

A solution of 5.25 g. of 2,2'-diphenyl-dialdehyde and 2.9 g. of 2-diethylaminoethylamine in 50 cc. of alcohol is shaken in a hydrogen atmosphere at room temperature and in the presence of 200 mg. of platinum oxide until the gas uptake ceases. In a period of two hours, about 1.15 liters of hydrogen is taken up. The catalyst is filtered off and the filtrate is concentrated. The residual oil is taken up in 30 cc. of alcohol and mixed with a solution of 6 g. of 85% phosphoric acid in 50 cc. of alcohol. There is thus obtained 11.7 g. of 6-(β-diethylaminoethyl)-6,7-dihydro-5H-dibenz[c,e]azepine diphosphate of M.P. 237–238°. After recrystallization from water/acetone this product melts at 238–239°.

*Example 16*

5.25 g. of 2,2'-diphenyl-dialdehyde, 2.7 g. of cyclohexylamine and 10 g. of 99% formic acid are heated at 120–140° until the evolution of carbon dioxide ends. The solution is cooled, mixed with 100 cc. of water, freed of neutral materials by extraction with ether, and the aqueous phase is made alkaline by addition of concentrated caustic soda solution. The oily base thus separated is taken up in ether, the ether solution is dried over anhydrous potassium carbonate, filtered and concentrated. There is thus obtained 6-cyclohexyl-6,7-dihydro-5H-dibenz[c,e]azepine as a light yellowish viscous oil. By addition of alcoholic hydrogen bromide to an alcoholic solution of the last mentioned base, there is obtained 6 - cyclohexyl - 6,7 - dihydro - 5H - dibenz[c,e]azepine hydrobromide of M.P. 262–263°.

*Example 17*

A solution of 5.25 g. of 2,2'-diphenyl-dialdehyde and 2.5 g. of cyclohexylamine in 50 cc. of alcohol is shaken in a hydrogen atmosphere at room temperature and in the presence of 200 mg. of platinum oxide until cessation of hydrogen uptake. In a period of 18 hours, about 1.2 liters of hydrogen is taken up. The catalyst is filtered off and the filtrate is evaporated. The residue is taken up in 40 cc. of dilute hydrochloric acid, extracted with ether, and the aqueous acidic phase is made alkaline by addition of concentrated caustic soda solution. The oil which separates is taken up in ether, the ethereal solution is dried over anhydrous potassium carbonate, filtered and concentrated. The light greenish residual oil, 6-cyclohexyl-6,7-dihydro-5H-dibenz[c,e]azepine, is taken up in alcohol and mixed with alcoholic hydrogen bromide, whereby the hydrobromide of M.P. 262–263° separates.

*Example 18*

A solution of 2.3 g. of sodium in 160 cc. of absolute alcohol is mixed with a solution of 19.5 g. of 6,7-dihydro-5H-dibenz[c,e]azepine in 20 cc. of absolute alcohol. To this solution is added dropwise within a period of 40 minutes, at room temperature, a solution of 12.1 g. of freshly distilled allyl bromide in 20 cc. of absolute alcohol. The reaction mixture is stirred for 24 hours at room temperature, then the sodium bromide which has separated is filtered off, and the filtrate is evaporated under diminished pressure. The oily residue, containing crystalline material, is mixed with 150 cc. of water and the emulsion formed is extracted twice with 100 cc. portions of benzene. The combined benzene solutions are washed with 50 cc. of water and then dried over anhydrous potassium carbonate. The reaction mixture is filtered and the solvent is removed from the filtrate. The oily residue is taken up in 20 cc. of alcohol and mixed with 30 g. of 25% ethanolic hydrogen chloride, whereby upon cooling a colorless crystalline slurry is formed. By filtering off and drying the solid there is obtained 23 g. of 6-allyl-6,7-dihydro-5H-dibenz[c,e]azepine hydrochloride, which after crystallization from alcohol melts at 213–214°.

20 g. of this hydrochloride is dissolved in 100 cc. of water, mixed with 25 cc. of 4 N caustic soda solution and the base which separates is taken up in 100 cc. of benzene. The benzene solution is dried over anhydrous potassium carbonate and then evaporated. There is obtained as a residue 17 g. of a colorless oil of 6-allyl-6,7-dihydro-5H-dibenz[c,e]azepine, which boils in a high vacuum at 124–126°/0.08 mm. The corresponding phosphate melts at 210–212°.

*Example 19*

A solution of 10.5 g. of 2,2'-diphenyl-dialdehyde, 7.0 g. of 30% aqueous methylamine solution and 20.0 g. of 99% formic acid are heated at 80–130° until the evolution of carbon dioxide ceases. The solution is cooled, mixed with 120 cc. of water and extracted with 50 cc. of ether. The aqueous layer is then brought to pH 10 by addition of concentrated caustic soda solution. The oil which separates is extracted by shaking the reaction mixture twice with 50 cc. portions of ether. The combined ethereal solutions are dried over anhydrous potassium carbonate, filtered and freed of solvent. The residue is distilled, whereupon 9.2 g. of 6-methyl-6,7-dihydro-5H-dibenz[c,e]azepine is obtained as almost colorless viscous oil which boils at 125–127°/0.2 mm.

By addition of alcoholic hydrogen chloride to an alcoholic solution of the base there is obtained the hydrochloride of M.P. 226–227°. The hydrobromide of M.P. 223–223.5° may be obtained in analogous manner using alcoholic hydrogen bromide.

*Example 20*

7.3 g. of 3-diethylaminopropylamine are added, while cooling, to a mixture of 10.5 g. of 2,2'-diphenyl-dialdehyde and 20.0 g. of 90% formic acid. The solution obtained is heated at 70–130° until completion of the evolution of carbon dioxide. After approximately 40 minutes the gas evolution ceases, whereupon the solution is cooled, mixed with 100 cc. of water and extracted with 50 cc. of ether. The aqueous layer is brought to pH 10 by addition of concentrated caustic soda solution, whereupon an oil separates which is extracted by shaking the reaction mixture twice with 60 cc. portions of ether. The combined ethereal solutions are dried over anhydrous potassium carbonate, filtered and freed of solvent. The light greenish viscous oil obtained consisting of 6-(3'-diethylaminopropyl)-6,7-dihydro-5H-dibenz[c,e]azepine is taken up in 60 cc. of methanol and mixed with 6.0 g. of 85% phosphoric acid. There is thus obtained 19.8 g. of 6-(3'-diethylaminopropyl)-6,7-dihydro-5H-dibenz[c,e]azepine diphosphate melting at 220–222°. After recrystallization from aqueous methanol this product melts at 223–225°.

We claim:

1. A process which comprises contacting 2,2'-diphenyl-dialdehyde with an amide of the formula

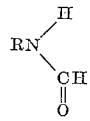

wherein R represents a member containing not more than eight carbon atoms selected from the group consisting of hydrogen, lower alkyl, lower alkenyl, ω-hydroxy-lower alkyl, ω-di(lower alkyl)amino(lower alkyl), monocyclic cycloalkyl, monocyclic aryl hydrocarbon and monocyclic aralkyl hydrocarbon, and reducing the reaction product with formic acid, thereby forming a compound of the formula

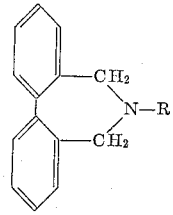

wherein R has the same meaning indicated above.

2. A process which comprises contacting 2,2'-diphenyl-dialdehyde with formamide and reducing the reaction product with formic acid, thereby forming 6-formyl-6,7-dihydro-5H-dibenz[c,e]azepine, and splitting off the formyl group from the latter by reaction with a mineral acid hydrolyzing reagent, thereby forming 6,7-dihydro-5H-dibenz[c,e]-azepine.

3. A process which comprises contacting 2,2'-diphenyl dialdehyde with formic acid allyl amide and reducing the reaction product with formic acid, thereby forming 6-allyl-6,7-dihydro-5H-dibenz[c,e]azepine.

References Cited in the file of this patent

UNITED STATES PATENTS 2,619,484  Wenner _____ Nov. 25, 1952

OTHER REFERENCES

Schindler et al.: Helv. Chim. Acta, vol. 37, pp. 472–83 (1954).

Karrer: Organic Chemistry, Second English Edition, 1946, page 188.